United States Patent
Min

(10) Patent No.: US 11,527,913 B2
(45) Date of Patent: Dec. 13, 2022

(54) WIRELESS CHARGING DEVICE FOR PORTABLE TERMINAL

(71) Applicant: FOURING CO., LTD., Seoul (KR)

(72) Inventor: Jee Hong Min, Seoul (KR)

(73) Assignee: FOURING CO., LTD, Seoul (KR)

( * ) Notice: Subject to any disclaimer, the term of this patent is extended or adjusted under 35 U.S.C. 154(b) by 82 days.

(21) Appl. No.: 16/766,173

(22) PCT Filed: Nov. 21, 2018

(86) PCT No.: PCT/KR2018/014335
§ 371 (c)(1),
(2) Date: May 21, 2020

(87) PCT Pub. No.: WO2019/103448
PCT Pub. Date: May 31, 2019

(65) Prior Publication Data
US 2020/0366131 A1    Nov. 19, 2020

(30) Foreign Application Priority Data

Nov. 22, 2017 (KR) .................. 20-2017-0005942
Aug. 10, 2018 (KR) .................. 10-2018-0093807
Nov. 21, 2018 (KR) .................. 10-2018-0144202

(51) Int. Cl.
*H01M 10/46* (2006.01)
*H02J 50/10* (2016.01)
(Continued)

(52) U.S. Cl.
CPC .......... *H02J 50/10* (2016.02); *B60R 11/0241* (2013.01); *H02J 7/0044* (2013.01)

(58) Field of Classification Search
CPC ........ H02J 7/0044; H02J 7/0042; H02J 50/10; H02J 50/005
(Continued)

(56) References Cited

U.S. PATENT DOCUMENTS 7,180,265 B2 * 2/2007 Naskali .................. H02J 50/40
320/108
9,300,151 B2 * 3/2016 Chen ...................... H02J 7/025
(Continued)

FOREIGN PATENT DOCUMENTS

JP    2016-519860 A    7/2016
KR    10-1062570 B1    9/2011
(Continued)

*Primary Examiner* — Edward Tso
(74) *Attorney, Agent, or Firm* — Bridgeway IP Law Group, PLLC; Sang Ho Lee; Hyun Woo Shin

(57) ABSTRACT

Provided is a portable terminal wireless charging device including: a terminal accessory fixed to a back surface of the portable terminal and embedded a transmitting coil for generating a magnetic field for wireless charging of a magnetic induction type; and a wireless charging module coupled to the terminal accessory and including a circuit unit for supplying a AC power to the transmitting coil. Since the terminal accessory and the wireless charging module are each provided with a first electric contact and a second electric contact, when the terminal accessory is coupled to the wireless charging module, the first and second electric contacts are contacted with each other to supply the AC power from the circuit unit to the transmitting coil.

20 Claims, 15 Drawing Sheets

(51) Int. Cl.
*B60R 11/02* (2006.01)
*H02J 7/00* (2006.01)

(58) Field of Classification Search
USPC ................................ 320/107, 108, 114, 115
See application file for complete search history.

(56) References Cited

U.S. PATENT DOCUMENTS

| | | | |
|---|---|---|---|
| 9,319,086 B2* | 4/2016 | Wong .................... | F16M 11/041 |
| 9,368,999 B2* | 6/2016 | Watanabe .............. | H02J 7/0044 |
| 9,772,066 B2* | 9/2017 | Tseng ..................... | F16M 11/14 |
| 2004/0145343 A1* | 7/2004 | Naskali ................. | H02J 7/0044 |
| | | | 320/108 |
| 2007/0135174 A1* | 6/2007 | Musk .................... | H02J 7/0044 |
| | | | 455/569.1 |
| 2015/0002088 A1* | 1/2015 | D'Agostino .......... | H02J 7/0044 |
| | | | 320/108 |
| 2017/0110902 A1* | 4/2017 | Miller ................... | H02J 7/0044 |

FOREIGN PATENT DOCUMENTS

| | | |
|---|---|---|
| KR | 10-1453889 B1 | 10/2014 |
| KR | 10-2015-0070691 A | 6/2015 |
| KR | 10-2016-0109190 A | 9/2016 |
| KR | 10-1718295 B1 | 3/2017 |
| KR | 10-1731827 B1 | 5/2017 |
| KR | 10-1738073 B1 | 5/2017 |
| KR | 10-2017-0134999 A | 12/2017 |
| WO | 2016/007234 A1 | 1/2016 |
| WO | 2017/048504 A2 | 3/2017 |

* cited by examiner (a)

(b)

WIRELESS CHARGING DEVICE FOR PORTABLE TERMINAL

TECHNICAL FIELD

The present invention relates to a wireless charging apparatus, and more particularly to a wireless charging apparatus for easily attaching to a portable terminal such as a smart phone and having a structure for charging wirelessly.

BACKGROUND ART

Various types of car cradles have been developed to facilitate the use of electronic devices including a smart phone when driving a vehicle.

In recent years, due to the development of smart phones, various functions such as a car navigation system and a black box have been integrated into the smart phone, and the need for the car cradle is increasing more and more.

Generally, the car cradle has a structure in which the smart phone is fitted to one end of the car cradle and then the other end is adsorbed and adhered to a glass or a dashboard of a vehicle. The car cradle has a structure in which the smart phone is fitted to one end side and then the other end side is adsorbed to the glass or the dashboard of the vehicle. However, since the above-mentioned car cradle is complicated in structure and heavy in weight, there is a problem that the car cradle can be easily separated from the attachment surface. In addition, when the user wants to use the smart phone while driving the vehicle, the smart phone must be pushed from the car cradle to the side to release the engaged state, which is troublesome to use.

Therefore, in recent years, it is very popular the minimal method by attaching a smart ring to the back of the smart phone and putting the smart ring in the trough of the vehicle.

The smart ring has advantages of easy attachment to the vehicle and easy removal, there is a problem that it is difficult to stably fix the smart phone to the vehicle, since the smart ring is easily detached from the fixed position due to vibration of the vehicle.

In addition, the position, in which the smart phone can be fixed to the vehicle, is restricted, since the smart ring is a small ring shape attached to the rear side of the smart phone. Accordingly, it is difficult to fix the smart phone at a position of a distance for matching the driver's view.

Meanwhile, various methods and apparatuses for wirelessly charging the portable terminal such as the smart phone have been developed in recent years, there is a problem that the charging efficiency is rapidly reduced when the smart phone is attached to the back of the smart phone with accessories such as a smart ring or a case.

DISCLOSURE

Technical Problem

It is an object of the present invention to provide a wireless charging apparatus for a portable terminal which can be easily attached to the portable terminal to use and improved in charging efficiency.

Technical Solution

According to an aspect of the present invention, there is provided a portable terminal wireless charging device, comprising: a terminal accessory fixed to a back surface of the portable terminal and embedded a transmitting coil for generating a magnetic field for wireless charging of a magnetic induction type; and a wireless charging module coupled to the terminal accessory and including a circuit unit for supplying a AC power to the transmitting coil; wherein since the terminal accessory and the wireless charging module are each provided with a first electric contact and a second electric contact, when the terminal accessory is coupled to the wireless charging module, the first and second electric contacts are contacted with each other to supply the AC power from the circuit unit to the transmitting coil.

The circuit unit may be embedded in the wireless charging module, or at least part of the circuit unit may be provided outside the wireless charging module to connect with the wireless charging module through a cable.

The terminal accessory further includes a rear housing fixed to the back surface of the portable terminal; and a front housing coupled to the rear housing to be rotatable.

Advantageous Effects

The present invention can effectively perform wireless charging even when an accessory such as a smart ring or a case is equipped in the portable terminal by allowing the portable terminal to be wirelessly charged using the magnetic field generated at the accessory, so that a transmitting coil is incorporated in the accessory fixed to the back surface of the portable terminal to supply AC power through an electric contact when the wireless charging module is equipped with a circuit unit.

Further, the position of the electric contacts are easily aligned when the wireless charging apparatus is coupled, since a guide is formed at the grounding portion where the accessory and the wireless charging module are coupled. The wireless charging efficiency can be improved by precisely positioning the transmit coil of the accessory and the receive coil of the portable terminal, According to another embodiment of the present invention, it is easy to carry with the fingers inserted in the mounting ring, the angle can be adjusted with less force, the angle-adjusted state is stably maintained, and it can be attached to a magnet mounted on the vehicle, thereby achieving good compatibility.

According to another embodiment of the present invention, it is possible to miniaturize the wireless charging module and to prevent the malfunction of the circuit unit due to the magnetic field, since the circuit unit for supplying AC power to the transmitting coil is provided outside the wireless charging module and is connected to the wireless charging module through a cable, and the convenience of use can be improved by rotating the accessory while being fixed to the back surface of the portable terminal.

BEST MODE

The following merely illustrates the principles of the invention. Therefore, those skilled in the art will be able to devise various apparatuses which, although not explicitly described or shown herein, embody the principles of the invention and are included in the concept and scope of the invention. Furthermore, all of the conditional terms and embodiments listed herein are, in principle, intended only for the purpose of enabling understanding of the concepts of the present invention, and are not to be construed as limited to such specifically recited embodiments and conditions do.

It is also to be understood that the detailed description, as well as the principles, aspects and embodiments of the invention, as well as specific embodiments thereof, are intended to cover structural and functional equivalents thereof. It is also to be understood that such equivalents include all elements contemplated to perform the same function irrespective of the currently known equivalents as well as the equivalents to be developed in the future, i.e., the structure.

The above and other objects, features and advantages of the present invention will become more apparent from the following detailed description of the present invention when taken in conjunction with the accompanying drawings, in which: There will be. In the following description, well-known functions or constructions are not described in detail since they would obscure the invention in unnecessary detail.

Figure 1:
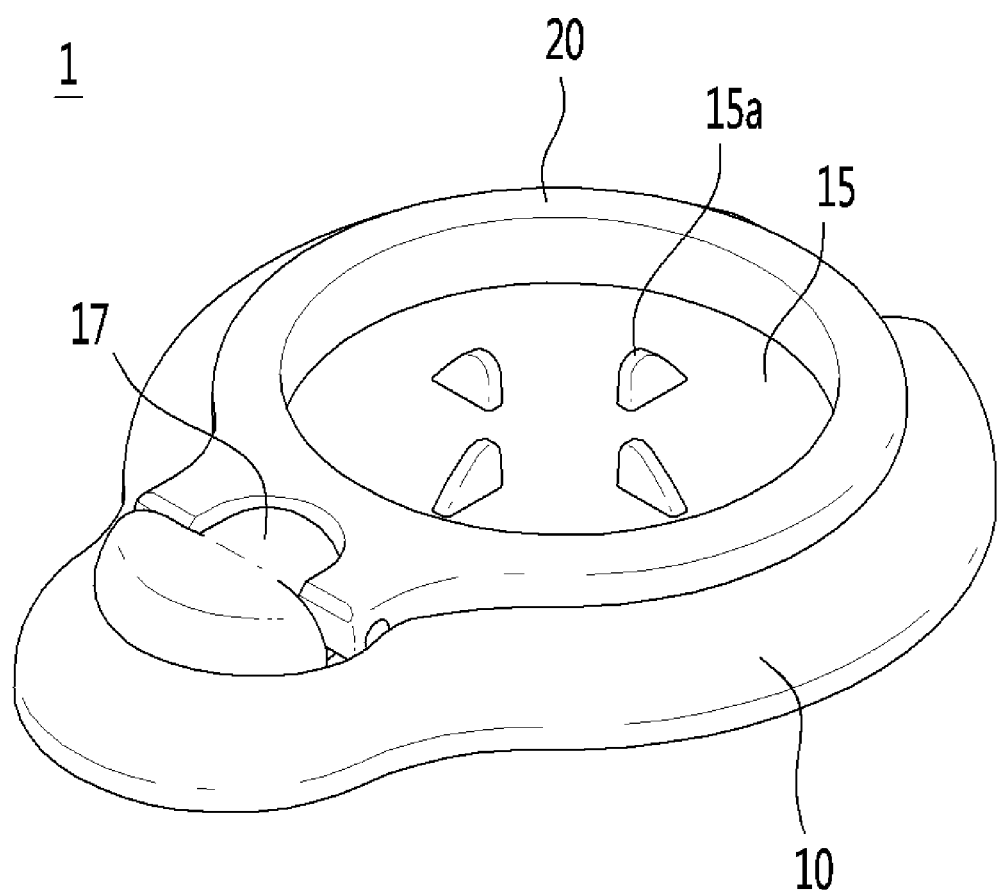
FIG. 1 is a perspective view illustrating a configuration of a cradle for a portable terminal according to an embodiment of the present invention.
Figure 2:
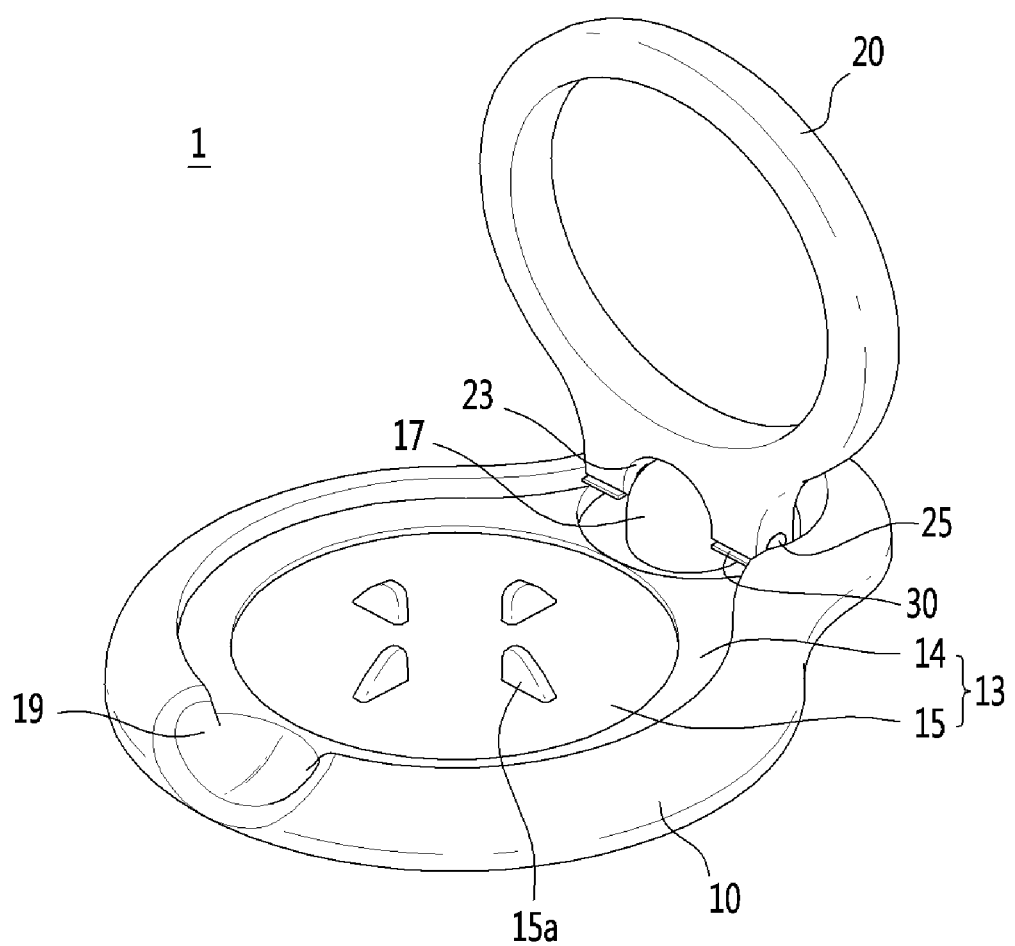
FIG. 2 is a perspective view showing a state in which a mounting ring is rotated in a ring holder of a cradle for a portable terminal.
Figure 3:
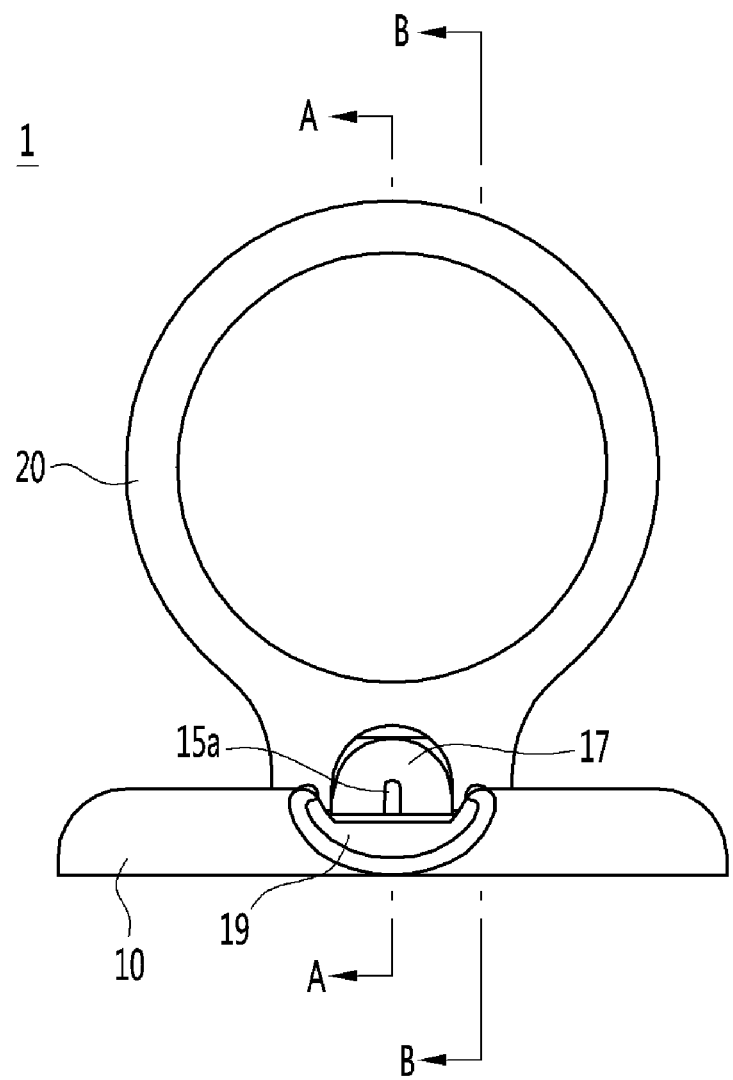
FIG. 3 is a front view showing a state in which the mounting ring is rotated in the ring holder of a cradle for a portable terminal.

FIG. 1 is a perspective view illustrating a configuration of a cradle for a portable terminal according to an embodiment of the present invention, FIG. 2 is a perspective view showing a state in which a mounting ring is rotated in a ring holder of a cradle for a portable terminal, and FIG. 3 is a front view showing a state in which the mounting ring is rotated in the ring holder of a cradle for a portable terminal.

As shown in FIGS. 1 to 3, a cradle for the portable terminal according to an embodiment of the present invention includes a ring holder 10, and a mounting ring 20 which is formed with ring-shaped, one end of which is rotatably accommodated in the ring holder 10, and adjustable angle of rotation.

The ring holder 10 is attached to the rear surface of the portable terminal H while forming a body of a portable terminal's cradle 1 and may be formed of various kinds of materials such as a metal material or a synthetic resin material. When the ring holder 10 is made of a synthetic resin material or the like, at least in part, a material attached by magnetic force is attached to the attachment portion 101 of the mount 100 fixed to the vehicle.

The portable terminal may be a smart phone and various smart devices, but the present invention is not limited thereto.

The ring holder 10 is formed in a flat plate shape so as to be stably mounted on the ground as attaching to the portable terminal. In addition, the circumferential surface of the ring holder 10 is formed as a curved surface, and the front inner side portion of the ring is formed to be opened. The circumferential surface of the ring holder 10 may be formed to have a circular or polygonal shape.

Specifically, the ring holder 10 includes an attachment surface 11, a mounting portion 13, and a pivot shaft portion 17.

The attachment surface 11 corresponds to the rear surface of the ring holder 10 and is attached to the rear surface of the portable terminal H with an adhesive. The rear surface of the ring holder 10 forms the attachment surface 11 on which the attachment to the rear surface of the portable terminal H is achieved. The adhesive may be an adhesive film attached to the rear surface of the ring holder 10, and the adhesive film may be used to have excellent adhesive force and to be cleanly removed without leaving traces at the detachment time.

The mounting portion 13 corresponds to the front surface of the ring holder 10 opposite to the attachment surface 11 in the ring holder 10 and the other portion except for the rim in the front surface is formed by being recessed inward. That is, the mounting portion 13 may be formed by opening the front inner portion except for the rim.

The mounting ring 20 is rotatably received in the mounting portion 13. The mounting portion 13 is formed to have a space in which the mounting ring 20 can be received horizontally. The mounting ring 20 is accommodated horizontally in the edge portion of the mounting portion 13. The portable terminal's cradle 1 forms a flat surface as the mounting ring 20 is accommodated in the mounting portion 13. Accordingly, the stability can be achieved by laying the portable terminal with the portable terminal's cradle 1 attached to the back of the portable terminal.

As shown in FIG. 2, the mounting portion 13 includes an edge 14 in which the mounting ring 20 is received, and a central circular holder 15 which is formed downwardly from the edge 14.

A magnet may be embedded in the ring holder 10 at a position corresponding to the holder 15. However, since the ring holder 10 is made of a metal material, and the magnet is embedded only in the attachment portion 101 of the mount 100 fixed to the vehicle, the attachment portion 101 can be attached to the holder portion 15 by the magnetic force.

The circular holder 15 is formed with a protrusion 15a for preventing slip after attaching to the mounting portion 101 by the magnetic force. The projection 15a is engaged with the groove formed in the attachment portion 101. The protrusions 15a are arranged in a symmetrical shape so that they can be attached irrespective of the attachment portion 101 and the direction of attachment. The protrusion 15a improves the fixation and stability of the portable terminal 1, when the portable terminal's cradle 1 is attached to the mount 100 fixed to the vehicle by the magnetic force.

The circular holder 15 can be used for fitting the portable terminal's cradle 1 to a user's finger, for mounting on a desk, kitchen, dressing table and so on by adjusting the angle, or for attaching to the mount 100 fixed to the vehicle by the magnetic force, thereby enhancing the compatibility.

An opening 19 is formed in the front edge of the ring holder 10 so that the user can grasp and adjust the mounting ring 20 received in the mounting portion 13.

As shown in FIGS. 2 and 3, the opening 19 is formed to be rounded and downward inclined shape from the inner side to the outer side in the front edge, so that the user can easily grip the mounting ring 20.

The pivot shaft portion 17 is provided at one end of the mounting portion 13 and the mounting ring 20 is rotatably coupled thereto. The pivot shaft portion 17 has a shaft hole 18 formed therethrough. A fixing pin 25 for pivoting the mounting ring 20 is inserted into the shaft hole 18.

The mounting ring 20 is formed in a ring shape so that the user's finger can be fitted. The mounting ring 20 fixes the portable terminal so that the user does not drop the portable terminal when the user uses the portable terminal with his or her finger.

A ring-shaped portion of the mounting ring 20 is received in the mounting portion 13, and one end of the ring shape is rotatable with respect to the pivot shaft portion 17. The mounting ring 20 is formed of a metal material.

One end of the mounting ring 20 is formed with a central recessed portion 23 into which the pivot shaft portion 17 is inserted, and a pin hole 21 of the mounting ring 20 to be described later and the shaft hole 18 of the pivot shaft portion 17 are mutually linked with each other, as the pivot shaft portion 17 is inserted into the central recessed portion 23. The central recessed portion 23 is formed by smoothly rotating without interfering with the pivot shaft portion 17 and the mounting ring 20 at the time of rotation of the mounting ring 20.

In the embodiment of the present invention, the central recessed portion 23 is formed in a semicircular shape, and the central recessed portion may form an identical plane extending from the front surface of the pivot shaft portion 17 in a state in which the mounting ring 20 is horizontally accommodated in the mounting portion 13, while the central recessed portion may prevent the interference of the mounting ring 20 and the pivot shaft portion 17 due to ride over the pivot shaft portion 17 while being spaced apart from the shaft portion 17 in a state the mounting ring 20 is rotated.

Hereinafter, the construction of the mounting ring capable of pivoting operation will be described in more detail.

Figure 4:
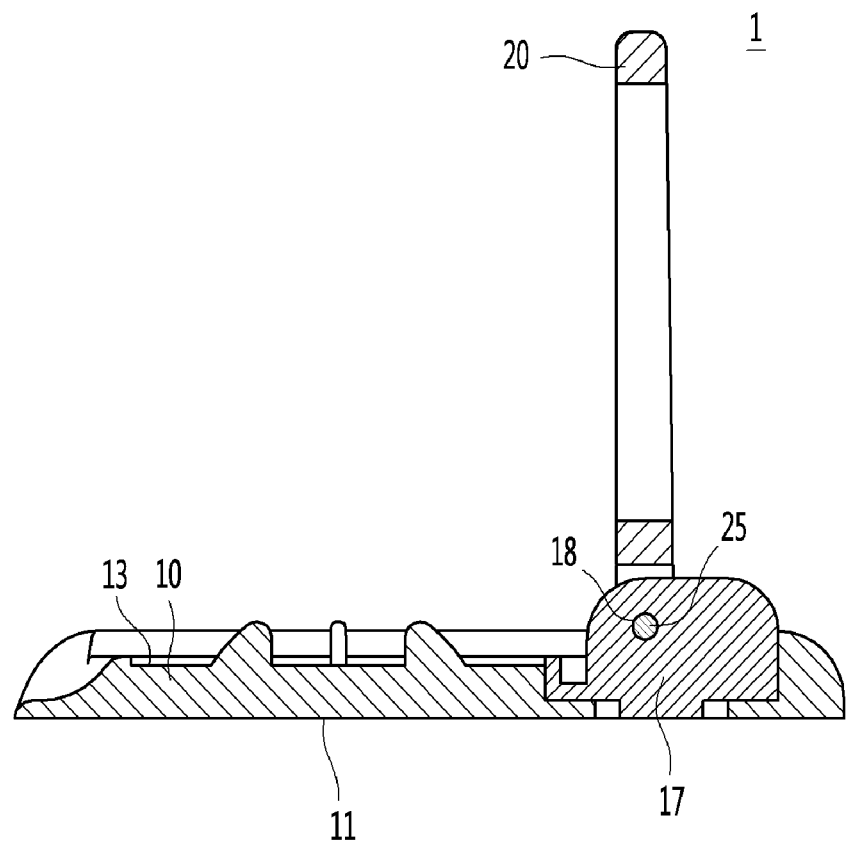
FIGS. 4 and 5 are cross-sectional views illustrating a cross-sectional configuration of a cradle for a portable terminal according to an embodiment of the present invention.
Figure 5:
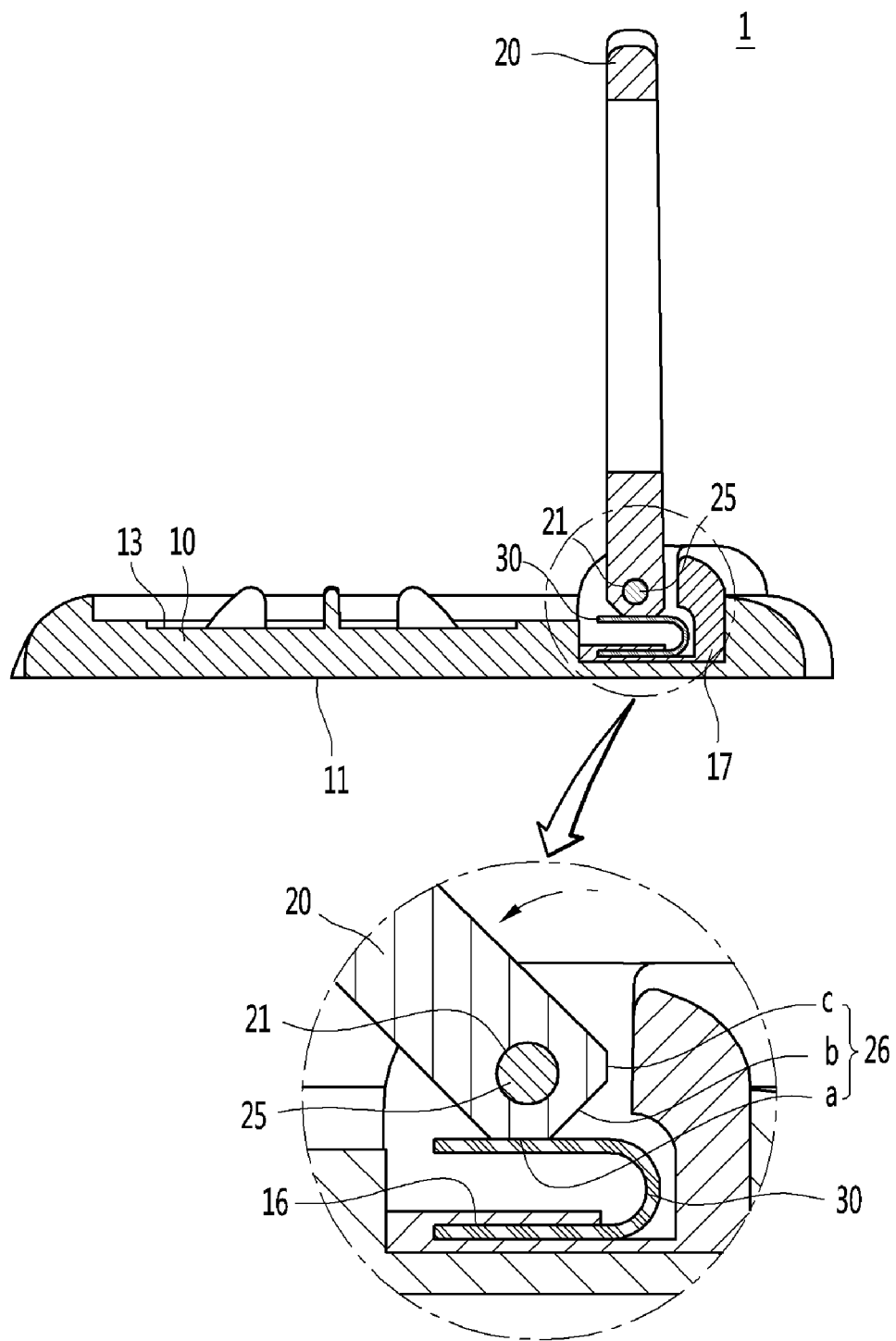

FIG. 4 is a cross-sectional view taken along line A-A of FIG. 3, FIG. 5 is a sectional view taken along line B-B of FIG. 3. The cross-section of the pivot shaft portion is illustrated in FIG. 4. FIG. 5 is a cross section of viewing a configuration in which one end of the mounting ring is pivotable on the pivot shaft portion.

According to FIG. 4, the rear surface of the ring holder 10 is formed in the flat plate shape, so that the attachment to the portable terminal H can be performed stably. The ring holder 10 has a predetermined thickness, the circumferential surface is formed as the curved surface, and the projection 15a is formed in the central circular holder 15 of the ring holder. As the circumferential surface of the ring holder 10 is formed as the curved surface, it can be provided beautiful appearance and smooth grip to the user's hand. The thickness of the ring holder 10 is thin to about 1 cm, so that when the mounting ring 20 is folded, the whole appearance is neat and slim due to the thin thickness.

In the pivot shaft portion 17, the shaft hole 18 is formed through the right and left sides, respectively to insert the fixing pin 25. The mounting ring 20 is set at 90 degrees to be rotatable with respect to the ring holder 10.

According to FIG. 5, the pin hole 21 is provided in one end of the mounting ring 20. The pin hole 21 is penetrated with the shaft hole 18 of the pivot shaft portion 17.

In a state in which the shaft hole 18 of the pivot shaft portion 17 and the pin hole 21 of the mounting ring 20 are mutually penetrated each other, one end of the mounting ring 20 may be rotatable with respect to the pivot shaft portion 17 by inserting the fixing pin 25 into the pin hole 21 and the shaft hole 18.

Either one of the shaft hole 18 of the pivot shaft portion 17 and the pin hole 21 of the mounting ring 10 is coupled to the fixing pin 25 in a pinched manner to be fixed integrally, and the other one has relative clearance relative to the fixing pin 25 and facilitates the rotation of the mounting ring 10 with respect to the pivot shaft portion 17.

For example, since the fixing pin 25 is inserted into the shaft hole 18 of the pivot shaft portion 17 in the pinched manner, the mounting ring can be pivotable on the pin hole 21 but not pivotable on the pivot shaft portion 17, thereby pivoting only one end of the mounting ring 10 with respect to the fixing pin 25 inserted into the shaft hole 18.

A plurality of angles 26 are formed on the outer peripheral surface of one end of the mounting ring 10, a plate spring 30 is provided on the mounting portion 13 at a position corresponding to the plurality of angles 26 of the mounting ring 10.

The plate spring 30 is closely adhered to any one of the plurality of angles 26 of the outer peripheral surface of the one end of the mounting ring 10, and provides an elastic force to upwardly push up the outer peripheral surface of the one end of the mounting ring 10.

The plurality of angles 26 and the plate springs 30 formed on the outer peripheral surface of the one end of the mounting ring 20 are configuration members for adjusting the angle of the mounting ring 20. For example, the plurality of angles 26 are three angles, the plate spring 30 may be in a shape of '⊃'. The plurality of angles 26 formed at one end of the mounting ring 20 allows the angle of the mounting ring 20 to be adjusted stepwise.

The plate spring 30 may be attached to the mounting portion 13 in the attachment manner. Otherwise, when an insertion portion 16 is formed in the ring holder 10, the plate spring may be attached in the manner that one side of the "⊃" shaped plate spring 30 is inserted into the insertion portion 16, the other side of the plate spring may be disposed in the mounting portion 13.

In the embodiment of the present invention, the plate spring 30 may provide the elastic force to upwardly push up the one end peripheral face of the mounting ring 20, since one side of the plate spring 30 is inserted into the insertion portion 16 formed to open rearward to the ring holder 10, and the other opposite side is placed in the mounting portion 13.

Since one side of the plate spring 30 inserted into the insertion portion 16 is formed into a single plate shape, the other side of the plate spring disposed in the mounting portion 13 is formed into a two plate shape separated into two parts in one plate shape, it is possible to provide the elastic force for simultaneously raising both ends of the mounting ring 20 upward as the plate springs are disposed on both sides of the pivot shaft portion 17.

When the plate spring 30 is fitted in the insertion portion 16 formed in the mounting portion 13, the manufacture will be easy because each component is manufactured and the assembly may be completed only by assembling work.

The operation of the present invention will be described below.

First, the pivoting process of the mounting ring will be described with reference to FIGS. 1 and 5.

As shown in FIG. 1, as the mounting ring 20 is accommodated horizontally in the edge portion of the mounting portion 13, the user grips and rotates the mounting ring 20 exposed forward the opening 19 by the user's hand, one end of the mounting ring 20 is pivoted on the pivot shaft portion 17.

At this time, as shown in the enlarged view shown in FIG. 5, one time force is applied to pivot the mounting ring 20, and if the force is removed, the one end of the mounting ring 20 closely adheres into the plate spring 30 to upwardly push by the elastic force of the plate spring 30, thereby maintaining the angular adjustment of the mounting ring.

In this state, the mounting ring 20 is pivoted by applying more force and the force is removed, as shown in FIG. 5, other angle b of the mounting ring 20 is closely adhered to the plate spring 30, and the angle-adjusted state is maintained by the force that is pushed up by the plate spring 30.

The above configuration is not use the frictional force of the pin and the pin hole, but adjusts the angle of the mounting ring 20 and maintains the angle-adjusted state by the plate spring 30 which is closely adhered to any one of the plurality of angles a, b, and c to provide the elastic force and the plurality of angles a, b, and c formed at one end of the mounting ring 20. Therefore, the angle can be adjusted with less force, and it is possible to maintain the angle-adjusted state stably due to have the supporting force and the durability.

Figure 6:
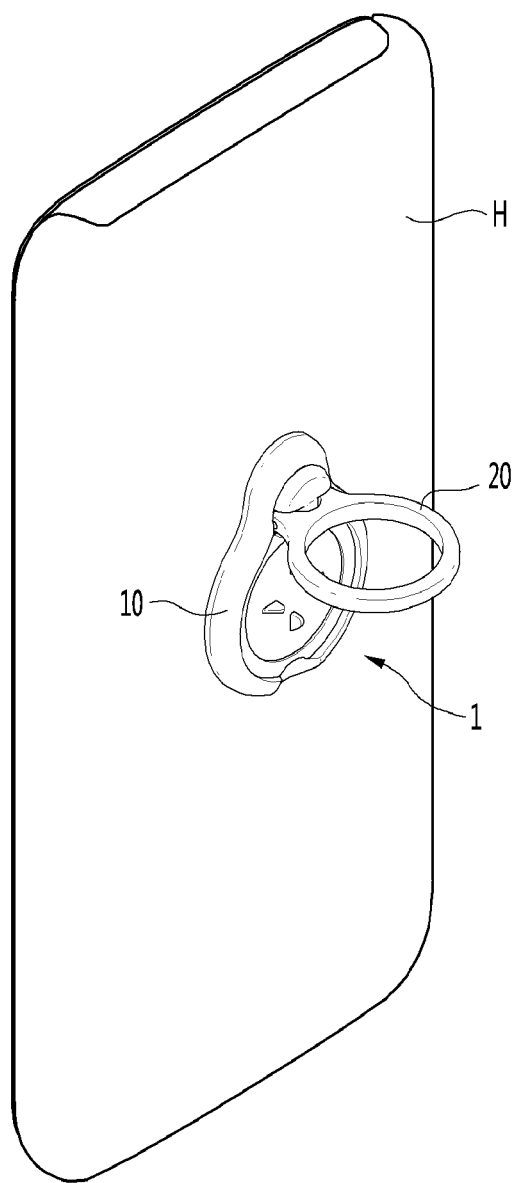
FIG. 6 is a view for explaining a method of holding a cradle for a portable terminal on a rear surface of the portable terminal according to an embodiment of the present invention.
Figure 7:
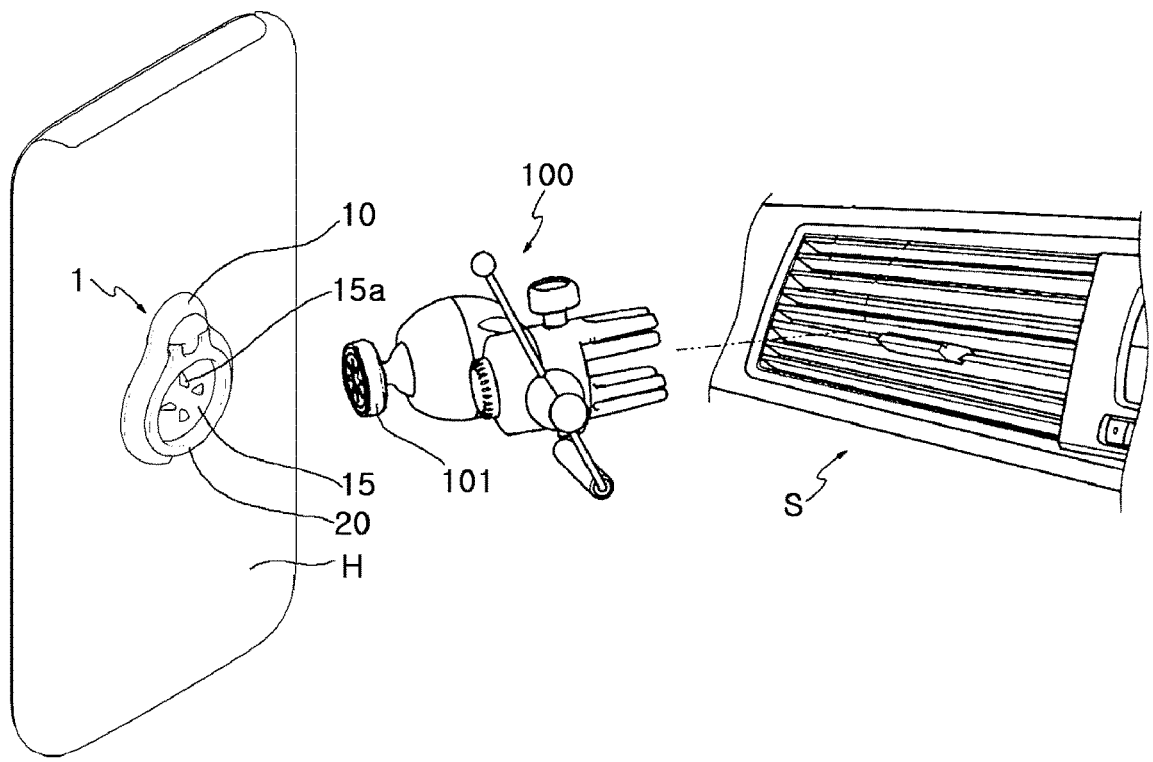
FIG. 7 is a view for explaining a method of holding a cradle for a portable terminal on a vehicle holder of the portable terminal according to an embodiment of the present invention.

FIG. 6 is a view illustrating an example in which the cradle for the portable terminal according to the present invention is mounted on the rear surface of the portable terminal, and FIG. 7 is a view illustrating an example in which the cradle for the portable terminal according to the present invention can be attached to the vehicle cradle.

The portable terminal's cradle 1 can adjust the angle of the mounting ring 20 with respect to the ring holder 10 in a state of being attached to the rear surface of the portable terminal H and the user can carry with the fingers inserted into the mounting ring 20.

Alternatively, as shown in FIG. 6, the portable terminal's cradle 1 can be mounted on the desk or floor by adjusting the angle of a mounting ring 20 with respect to the ring holder 10 in a state of being attached to the rear surface of the portable terminal H.

Alternatively, as shown in FIG. 7, the portable terminal's cradle 1 may be attached to the vehicle mount 100 fixed to the vehicle. In a state where the mounting ring 20 is horizontally accommodated in the edge portion of the mounting portion 13, the central circular holder 15 of the mounting portion 13 can be magnetically attached to the mounting portion 101 of the mount 100 secured to the vehicle.

If the portable terminal's cradle 1 attached to the rear surface of the portable terminal H is attached to the mounting portion 101 of the mount 100 fixed to the vehicle by the magnetic force, the portable terminal H can be easily separated from the mount 100 fixed to the vehicle by the simple operation of holding the portable terminal H by hand and pulling the portable terminal H toward the driver.

The above-mentioned portable terminal's cradle 1 is easy to carry with the finger placed on the mounting ring, the angle can be adjusted with less force, and the angle-adjusted state can be stably maintained.

In addition, the portable terminal's cradle 1 described above can be used for various purposes such as the first use for restraining the portable terminal H from falling by being inserted into the user's finger, the second use for mounting by adjusting the angle on the desk, the kitchen, or the vanity, or the third use for attaching to the mount 100 fixed to the vehicle by the magnetic force.

Figure 8:
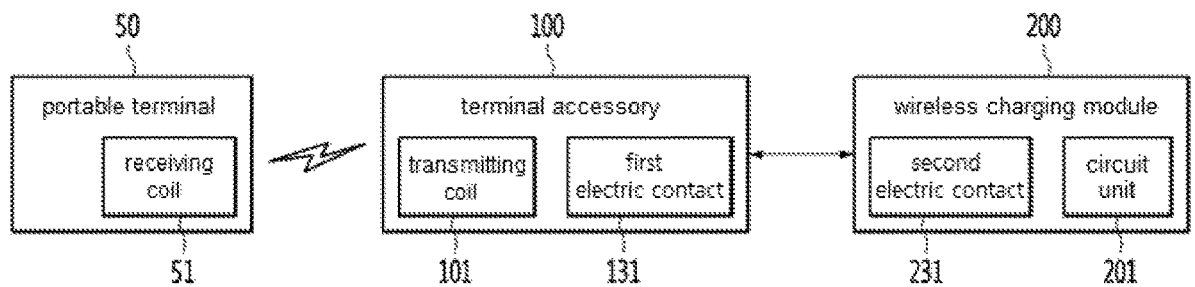
FIG. 8 is a block diagram showing the overall configuration of a wireless charging system according to an embodiment of the present invention.

FIG. 8 is a block diagram showing the overall configuration of a wireless charging system according to an embodiment of the present invention, and the illustrated wireless charging system may include a portable terminal 50, a terminal accessory 100, and a wireless charging module 200.

Referring to FIG. 8, the portable terminal 50 may be a smart phone, a PDA, a tablet PC, or the like, and may be a wireless charging device.

For example, the battery included in the portable terminal 50 can be charged by generating an induced current in the receiving coil by magnetic field generated in the transmitting coil by equipping the reception coil for magnetic charging of magnetic induction type.

The terminal accessory 100 is an attachment in the form fixed to the back surface of the portable terminal 50. For example, it can be various structures such as a smart ring, a mobile phone case, a bracket, or a clamp.

According to one embodiment of the present invention, the terminal accessory 100 equips the transmitting coil 101 for generating the magnetic field for wireless charging of the magnetic induction type.

Due to the magnetic field generated in the transmitting coil 101 embedded in the terminal accessory 100, the electromagnetic induction is occurred in the receiving coil 51 embedded in the portable terminal 50 and induced current is generated to wirelessly charge the battery (not shown) of the portable terminal 50.

Meanwhile, the wireless charging module 200 is configured separately from the terminal accessory 100, but the wireless charging module can be combined with the terminal accessory 100 if necessary (for example, during wirelessly charging operation).

The wireless charging module 200 is provided with a circuit unit 201 for supplying AC power to the transmitting coil 101 of the terminal accessory 100. Here, the circuit unit 201 may be embedded in the wireless charging module 200, the present invention is not limited thereto, at least some of the components constituting the circuit unit 201 may be implemented outside of the wireless charging module 200.

Further, as shown in FIG. 8, the terminal accessory 100 and the wireless charging module 200 may be provided with a first electric contact 131 and a second electric contact 231, respectively.

If the terminal accessory 100 and the wireless charging module 200 are combined, the first and second electric contacts 131 and 231 are in contact with each other, AC power may be supplied from the circuit unit 201 of the wireless charging module 200 to the transmitting coil 101 of the terminal accessory 100.

According to an embodiment of the present invention, as the transmitting coil 101 is embedded in the terminal accessory 100 fixed to the back surface of the portable terminal 50, the AC power can be supplied through the electric contacts 131 and 231 when the transmitting coil is coupled with the wireless charging module 200 having the circuit unit 201. Accordingly, the portable terminal 50 can be wirelessly charged using the magnetic field generated from the terminal accessory 100, and it is possible to effectively perform the wireless charging even when the terminal accessory 100 such as the smart ring or the case is mounted on the portable terminal 50.

Figure 9:
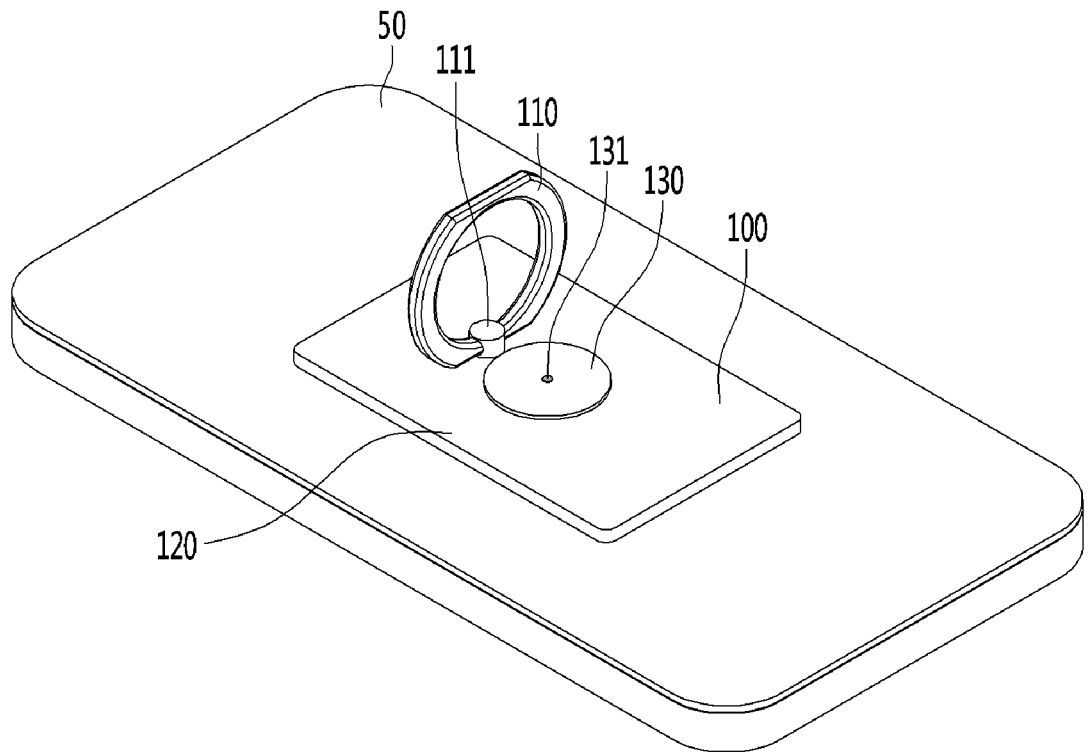
FIG. 9 is a perspective view illustrating a configuration of a terminal accessory according to an embodiment of the present invention.
Figure 10:
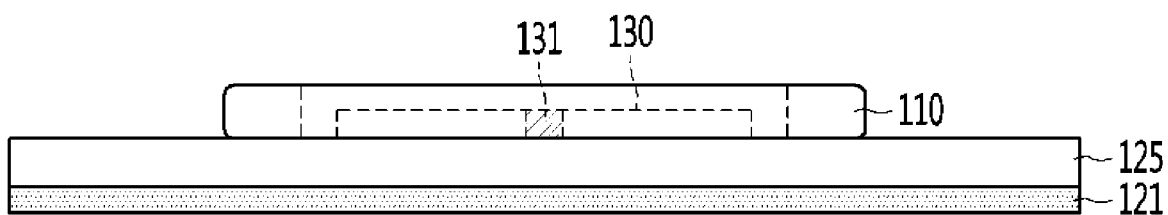
FIG. 10 is a cross-sectional view illustrating a configuration of a terminal accessory according to an embodiment of the present invention.

FIG. 9 is a perspective view illustrating a configuration of the terminal accessory according to an embodiment of the present invention, it is an embodiment of the case where the terminal accessory 100 is implemented as the smart ring including a ring. FIG. 10 shows an embodiment of the cross-sectional configuration of the terminal accessory 100 shown in FIG. 9, Referring to FIG. 9, the terminal accessory 100 may comprise a hook 110, an adhesive plate 120, and a first ground portion 130.

The hook 110 has a circle shape so that the user can insert his or her finger, as one side of the ring can have a flat shape to allow the terminal accessory 100 to stably support the portable terminal 50 by widening the contact area as contacting the bottom surface (not shown).

On the other hand, the hook 110 may be made of a metal material or a plastic material having high strength so as not to be easily broken by the user, and to be folded in the backward direction or in the opposite direction of the portable terminal 50 by connecting to the adhesive plate 120 using the connecting member 111.

The adhesive plate can be attached through an adhesive material (not shown) made of polyurethane or silicone, so that the state attached to the back surface of the portable terminal 50 is maintained.

Referring to FIG. 10, the adhesive plate 120 is composed of a first plate 125 and a second plate 121, the first plate 125 and the second plate 125 may be coupled to each other using an adhesive material, or may be engaged or screwed by grooves and projections.

The first plate 125 of the adhesive plate 120 may be made of a thermoplastic material such as a plastic, the second plate 121 may correspond to the first plate 125 and may be made of a polyurethane material or a silicone adhesive material.

On the other hand, the first grounding unit 130 is located on the adhesive plate 120, as shown in FIG. 9, the first electric contact 131 may be formed with circular shape and in the central portion thereof.

And, as shown in FIG. 10, the first grounding portion 130 may be formed to be located inside the circular space defined by the hook 110, in a state in which the hook 110 of the terminal accessory 100 is folded in the backward direction of the portable terminal 50.

In addition, in order for the terminal accessory 100 and the wireless charging module 200 to be magnetically coupled, the first ground portion 130 may be configured to include the metal or the magnet.

According to one embodiment of the present invention, the transmitting coil 101 may be embedded in the adhesive plate 120, more specifically, in the first plate 125 of the adhesive plate 120 as described above.

When the transmitting coil 101 embedded in the first plate 125 of the adhesive plate 120 is connected to the first electric contact 131 of the first grounding portion 130, and the terminal accessory 100 and the wireless charging module 200 are coupled together using the first and second grounding portions 130, then the AC power supplied from the wireless charging module 200 through the first electric contact 131 may be transmitted to the transmitting coil 101 to generate the magnetic field.

According to one embodiment of the present invention, the wireless charging module 200 may be implemented in the form of the vehicle mount for use in the vehicle.

Figure 11:
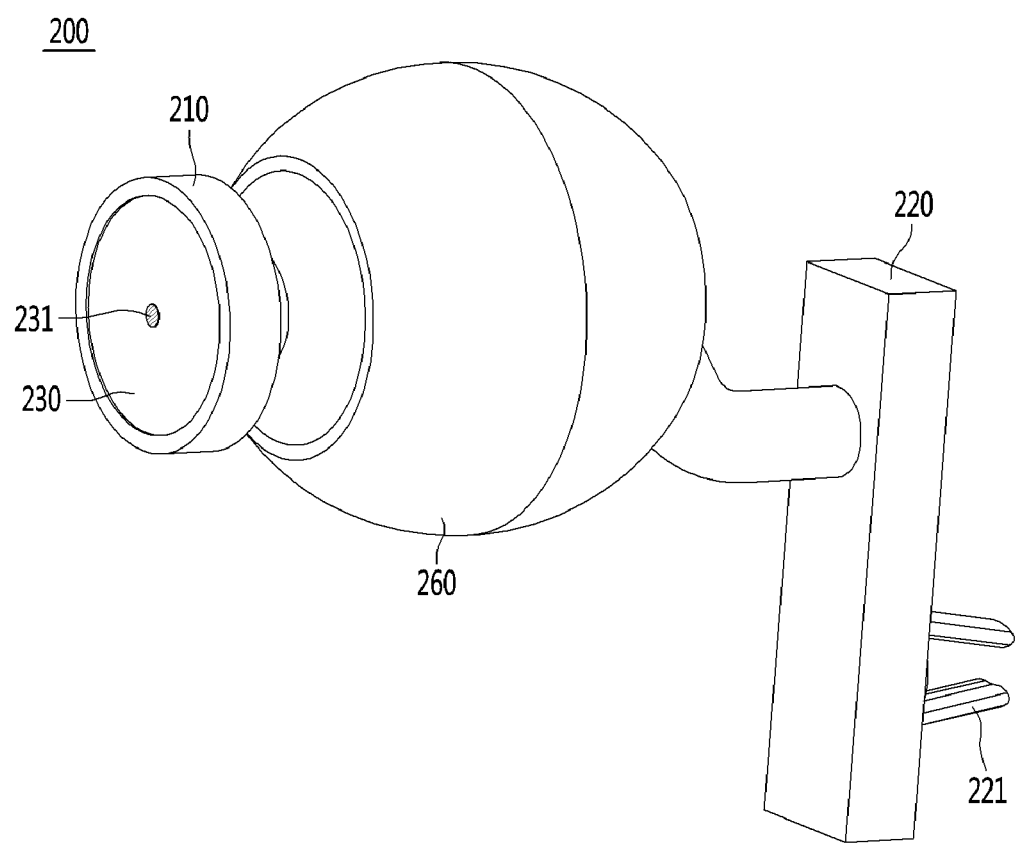
FIG. 11 is a perspective view illustrating a configuration of a wireless charging module according to an embodiment of the present invention.

FIG. 11 is a perspective view illustrating a configuration of the wireless charging module according to the embodiment of the present invention, and the wireless charging module 200 is implemented in a form that can be fixed to the vehicle by the fitting or the attraction force.

Referring to FIG. 11, the wireless charging module 200 may include an attachment portion 210, a fixing portion 220, and a connection portion 260.

The attachment portion 210 of the wireless charging module 200 is for coupling the wireless charging module 200 and the terminal accessory 100, for example, the attachment portion 210 of the wireless charging module 200 and the terminal accessory 100 may be attached magnetically.

The attachment portion 210 is formed with a second ground portion 230 coupled to the first ground portion 130 of the terminal accessory 100, the second ground portion 230 may have a shape (e.g., a circle) and a size corresponding to the first ground portion 130 of the terminal accessory 100.

On the other hand, the second electric contact 231 is located at the center of the second ground portion 230, as the first grounding portion 130 and the second grounding portion 230 are coupled, the first grounding terminal 131 and the second grounding terminal 231 are in contact with each other, then the AC power may be supplied from the circuit unit 201 of the wireless charging module 200 to the transmitting coil 101 of the terminal accessory 100.

As described above, in order for the terminal accessory 100 and the wireless charging module 200 to be magnetically attached, the attachment portion 210 or the second grounding portion 230 of the wireless charging module 200 may have the magnet, or the first ground portion 130 of the terminal accessory 100 may have the magnet.

For example, a first magnet is embedded in the first ground portion 130 side of the terminal accessory 100, a second magnet having an opposite polarity is embedded in the attachment portion 210 of the wireless charging module 200, or one magnet is embedded in either the first ground portion 130 of the terminal accessory 100 and the attachment portion 210 of the wireless charging module 200, and the other one is made of a metal, thereby mutually attaching by the magnetic force.

As described above, the terminal accessory 100 and the attachment portion 210 of the wireless charging module 200 may be attached with the magnet and the magnet or the magnet and the metal structure, the portable terminal 50 can be easily and stably coupled to the wireless charging module 200 by the simple operation of grasping the portable terminal 50 attached to the rear side of the terminal accessory 100 while the vehicle is in operation by the user's hand and taking it to the wireless charging module 200. Also, the portable terminal 50 can be easily separated from the wireless charging module 200 by the simple operation of pulling the portable terminal 50 to the user side.

In addition, since the second grounding portion 230 is formed to be drawn in a certain depth from the attachment portion 210 of the wireless charging module 200, when the first grounding portion 130 of the terminal accessory 100 is coupled to the second grounding portion by the magnetic force, the first grounding portion 130 is seated in the concave space formed by the second grounding portion 230 of the attachment portion 210 with almost no gap, then the first and second electric contacts 131 and 231 can be aligned and contacted with more accurate positions.

The circuit unit 201 for supplying the AC power to the transmitting coil 101 of the terminal accessory 100 may be incorporated in the attachment portion 210 of the wireless charging module 200.

When the terminal accessory 100 and the wireless charging module 200 are combined, the AC power output from the circuit unit 201 is supplied to the transmitting coil 101 of the terminal accessory 100 through the first and second electric contacts 131 and 231 which are in contact with each other.

The fixing portion 210 is for fixing the wireless charging module 200 to the vehicle in a fitting manner, for example, as shown in FIG. 11, the fixing portion includes a pair of engagement pins 221 for fitting into a ventilation hole (not shown) of the vehicle.

The coupling pins 221 are elastically deformed and are press-fitted into the ventilation hole of the vehicle, then the fitted state can be firmly fixed.

In the above description, the fixing portion 210 is provided with the pair of coupling pins 221 which are elastically deformable. However, the present invention is not limited thereto, various shapes can be employed that can be fitted to the blowholes of the vehicle by the elastic deformation and fixed in a press-fit manner.

In addition, the fixing portion 220 of the wireless charging module 200 may be configured to be fixed to the vehicle by an adsorption method.

The attachment portion 210 and the fixing portion 220 of the wireless charging module 200 are connected by the connection portion 260, the connection portion 260 may be configured to be adjustable in angle by rotation.

For example, the attachment portion 210 and the fixing portion 220 of the wireless charging module 200 are connected by ball joint means, the attachment portion 210 can be rotatable with respect to the fixing portion 220.

The ball joint means is made by inserting and connecting two balls into an empty spherical ball housing, as being rotating with 360 degree, it is possible to easily adjust the angle of the portable terminal 50 up and down and left and right directions.

In this case, the attachment portion 210 and the fixing portion 220 of the wireless charging module 200 may each include a ball for connecting to the ball joint means.

Since the ball of the attachment portion 210 and the ball of the fixing portion 220 are each inserted into the empty spherical ball housing, respectively, to rotate relative to the ball housing, so that the attachment portion 210 may be capable of rotating 360 degrees free relative to the fixing portion 220.

The empty spherical ball housing is composed of two bodies, and after inserting two balls inside, it can be fixed the rotated state of the two balls by bolts and nuts (not shown).

The ball fixing means is arranged between the two balls, the two balls can be fixed in a state in which both sides of the ball are closely adhered to each other, as upper and lower moving members with both side slopes.

According to another embodiment of the present invention, in the first ground portion 130 of the terminal accessory 100 and the second ground portion 230 of the wireless charging module 200, a guide portion for facilitating the engagement between the guide portions may be formed.

Figure 12:
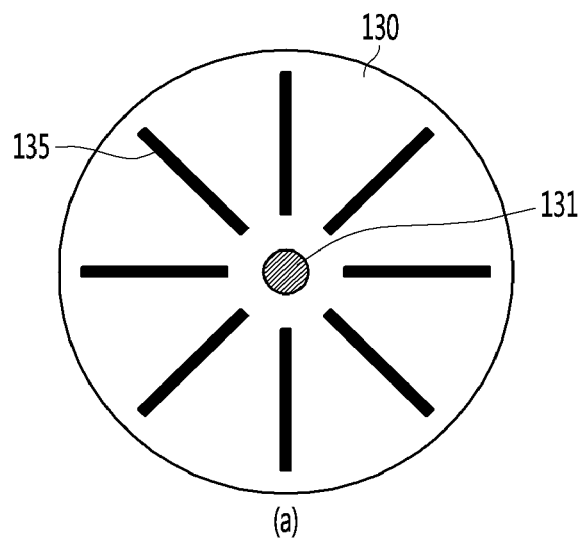
FIG. 12 is a view for explaining a configuration of grounding portions provided in the terminal accessory and the wireless charging module, respectively.
Figure 12:
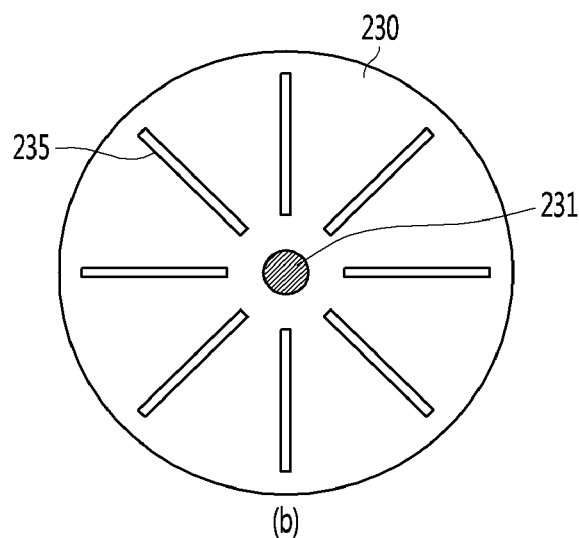

Referring to FIG. 12a, the first electric contact 131 is positioned at the center of the circular first ground portion 130, the first guide portion 135 is formed around the first electric contact 131 to facilitate connection with the wireless charging module.

On the other hand, referring to FIG. 12b, the second electric contact 231 is located at the center of the circular second ground portion 230, and a second guide portion 235 for facilitating engagement with the terminal accessory 100 may be formed corresponding to the first guide portion 135 formed on the first ground portion 130 of the terminal accessory 100 formed around the second electric contact 231.

Here, one of the first and second guide portions 135 and 235 includes at least one fixing protrusion, and the other may include at least one fixing groove into which the fixing protrusion is inserted.

For example, a plurality of fixing protrusions may be radially formed in the first ground portion 130 of the terminal accessory 100, while a plurality of fixing grooves may be radially formed in the second grounding portion 230 of the wireless charging module 200.

On the other hand, the fixing protrusions of a plate type are formed so as to have the slope that decreases in height from the center to both ends, the fixing groove is also formed so as to have the inclination corresponding to the inclination of the fixing projection, then the attachment through the natural coupling can be induced when the fixing protrusion is inserted into the fixing groove.

As described above, since the first and second guide portions 135 and 235 are formed in the first and second ground portions 130 and 230, respectively, to which the terminal accessory 100 and the wireless charging module 200 are coupled. Therefore, the positions of the first and second grounding terminals 131 and 231 can be easily aligned, thereby improving the wireless charging efficiency.

That is, when the terminal accessory 100 and the wireless charging module 200 are magnetically attached, the plurality of fixing protrusions formed on the first grounding portion 130 are inserted into the plurality of fixing grooves formed on the second grounding portion 230 so that the positions of the first grounding terminal 131 and the second grounding terminal 231 are naturally exactly matched, In addition, any rotation or slip after coupling can be prevented thereof.

Accordingly, while the terminal accessory 100 and the wireless charging module 200 are combined to perform wireless charging, the charging speed can be prevented from being reduced, if the first electric contact 131 and the second electric contact 231 are displaced from each other and the wireless charging is not performed, or even if the wireless charging efficiency drops.

Figure 13:
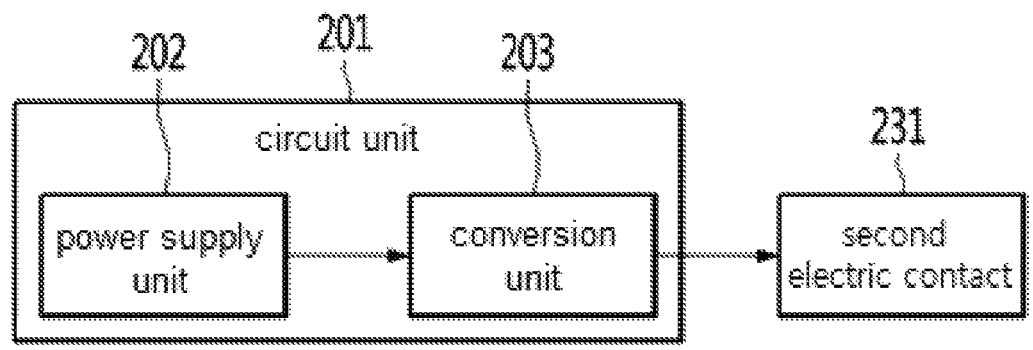
FIG. 13 is a block diagram showing a configuration of a circuit unit included in a wireless charging module according to an embodiment of the present invention.

FIG. 13 is a block diagram of a configuration of the circuit unit included in the wireless charging module, and the circuit unit 201 of the illustrated wireless charging module 200 may include a power supply unit 202 and a conversion unit 203.

Referring to FIG. 13, the power supply unit 202 receives the DC power from the outside, further includes a step down transformer to lower the supply voltage to a desired level, and a rectifier circuit to convert the AC voltage to a DC signal.

Also, the power supply unit 202 may include a power supply terminal connected to a cable of a separate charger to receive power from the outside.

The conversion unit 203 includes an oscillator for transmitting the AC power to the transmitting coil 101 through the second electric contact 231 by converting the DC voltage input from the power supply unit 202 into high frequency AC power.

FIG. 14 is a perspective view showing a state in which the terminal accessory and the wireless charging module are combined, and the description of the same components as those described above among the configurations shown in FIG. 14 will be omitted.

Figure 14:
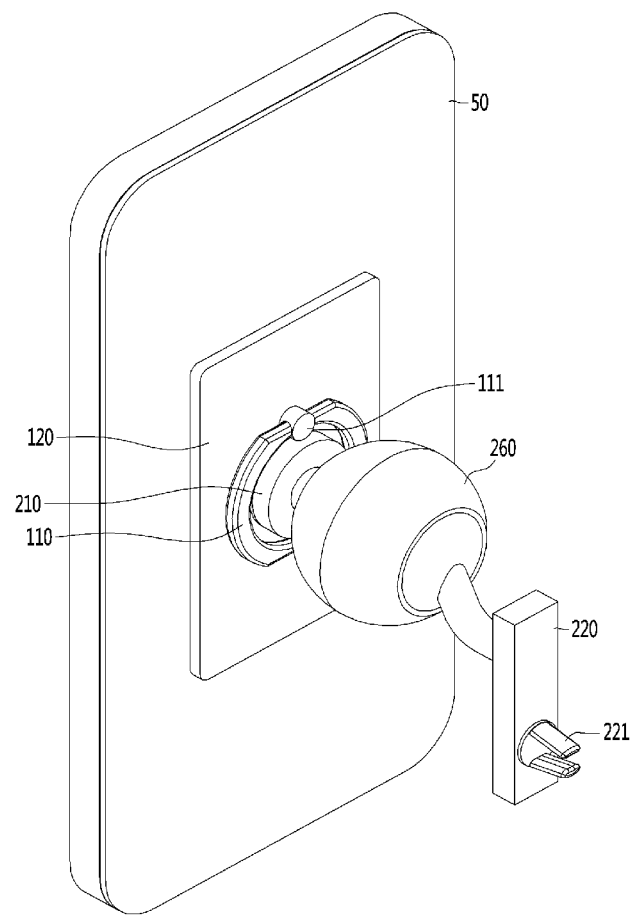
FIG. 14 is a perspective view showing a state in which a terminal accessory and a wireless charging module are combined according to an embodiment of the present invention.

Referring to FIG. 14, the portable terminal 50 includes the hook 110 on the back of, for example, the smart phone, the terminal accessory 100 in which the transmitting coil 101 is embedded may be attached to the adhesive plate 120.

Meanwhile, one side of the wireless charging module 200 is fixed to the air outlet of the vehicle through the fixing portion 220, and the attachment portion 210 in which the circuit unit 201 is embedded is formed on the other side.

In a state in which the hook 110 of the terminal accessory 100 attached to the back surface of the portable terminal 50 is folded, if the first ground portion 130 disposed in the inner space of the folded hook 110 is brought to the attachment portion 210 formed on the other side of the wireless charging module 200, then the first ground portion 130 of the terminal accessory 100 and the attachment portion 210 of the wireless charging module 200 can be coupled by the magnetic force.

At this time, as the plurality of fixing protrusions formed on the first grounding portion 130 of the terminal accessory 100 are inserted into the plurality of fixing grooves formed on the second grounding portion 230 of the wireless charging module 200, the positions of the first electric contact 131 of the terminal accessory 100 and the second electric contact 231 of the wireless charging module 200 can be naturally contacted with each other while being aligned.

When the first electric contact 131 of the terminal accessory 100 and the second electric contact 231 of the wireless charging module 200 are in contact with each other, the AC power output from the circuit unit 201 of the wireless charging module 200 is transmitted to the transmitting coil 101 through the first and second electric contacts 131 and 231, the electromagnetic waves are generated in the transmitting coil 101 by the transmitted AC power.

As described above, by the electromagnetic waves generated from the transmitting coil 101 of the terminal accessory 100, the current is induced in the receiving coil (not shown) embedded in the portable terminal 50, the battery (not shown) of the portable terminal 50 can be charged by the current induced in the receiving coil.

Here, through the product manual of the terminal accessory 100, the attachment position of the terminal accessory 100 can be guided to the user so that the position of the transmitting coil 101 of the terminal accessory 100 and the position of the receiving coil of the portable terminal 50 are precisely matched.

Since the positions of the receiving coils for wireless charging may slightly differ depending on the manufacturer of the portable terminal 50 or the product name, the attachment position of the terminal accessory 100 may be guided differently according to the manufacturer or product name.

As described above, when the terminal accessory 100 is attached to the back surface of the portable terminal 50, so that the position of the transmitting coil 101 of the terminal accessory 100 and the position of the receiving coil of the portable terminal 50 are exactly the same, the charging efficiency can be improved and the charging speed can be increased in combination with the wireless charging module 200, and the improved charging efficiency can be maintained continuously and stably, since the rotation or flow is prevented by the magnetic coupling and the guide portions 135 and 235.

In the above description, the smart phone including the ring is described as an example for the terminal accessory 100 fixed to the back surface of the portable terminal 50. However, the present invention is not limited thereto, and the smart phone case of being mounted on the back surface of the portable terminal 50 may be realized as the terminal accessory 100 having the above-described configuration.

In this case, the first grounding portion 130 having the first grounding terminal 131 as described above may be provided at the center of the outer surface of the smart phone case mounted on the back surface of the portable terminal 50, the transmitting coil 101 as described above is embedded in the smart phone case, the AC power is supplied from the circuit unit 201 of the wireless charging module 200 through the first electric contact 131, and the magnetic field for wireless charging can be generated.

Figure 15:
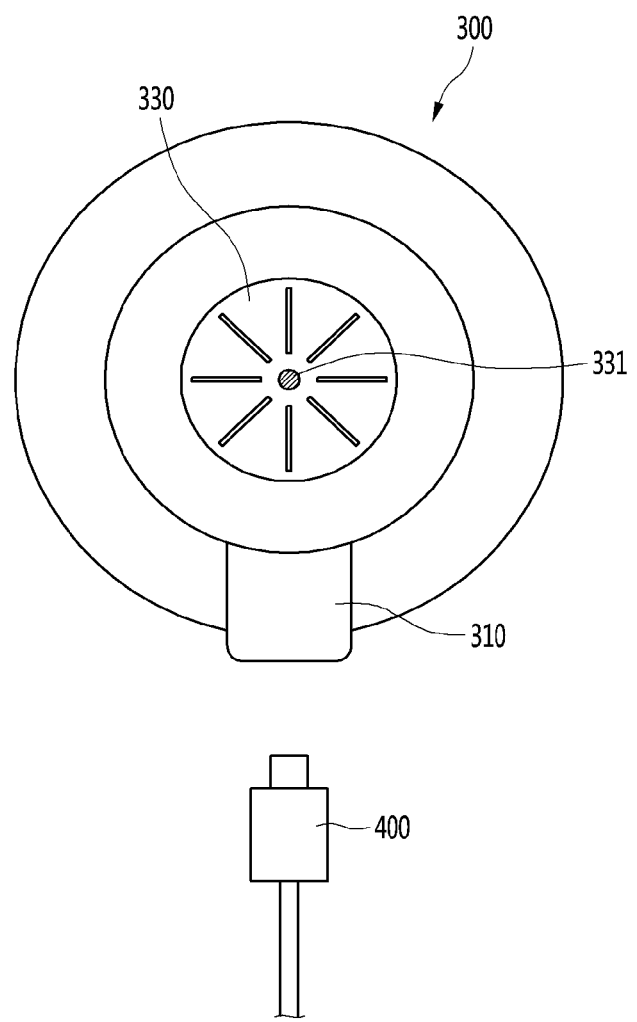
FIG. 15 is a view illustrating a configuration of a wireless charging module according to another embodiment of the present invention.

In the above description, the stationary device in which the wireless charging module 200 is fixed to the vehicle has been described as an example, and the present invention is not limited thereto and may be implemented as a table type wireless charging module in a form that can be placed on the floor as shown in FIG. 15.

Referring to FIG. 15, the second grounding part 330 having the second grounding terminal 331 is formed on the top surface of the table type wireless charging module 300, the configuration of the second grounding part 330 and the second grounding terminal 331 may be the same as that of the second grounding portion 230 and the second grounding terminal 231 as described above.

Meanwhile, the table type wireless charging module 300 includes the above-described circuit unit 201, and it is possible to provide the AC power to be supplied to the transmitting coil 101 of the terminal accessory 100.

In the table type wireless charging module 300, the cable 400 of the charger is inserted and a power supply terminal 310 supplied with the power from the outside.

In a state in which the hook 110 of the terminal accessory 100 attached to the back surface of the portable terminal 50 is folded as shown in FIG. 14, when the first grounding portion 130 disposed in the inner space of the folded hook 110 is brought to the second grounding portion 330 of the table type wireless charging module 300, the first grounding portion 130 of the terminal accessory 100 and the second grounding portion 330 of the table type wireless charging module 300 are coupled by the magnetic force so that the wireless charging can be started.

According to another embodiment of the present invention, the circuit unit for supplying AC power to the transmitting coil is provided outside the wireless charging module by connecting to the wireless charging module via cable, and it is possible to miniaturize the wireless charging module and to prevent the malfunction of the circuit due to the magnetic field, with the terminal accessory fixed to the back of the portable terminal so that the convenience of use can be improved.

Hereinafter, the configuration of the wireless charging system according to another embodiment of the present invention will be described in more detail with reference to FIG. 16 to 20

Figure 16:
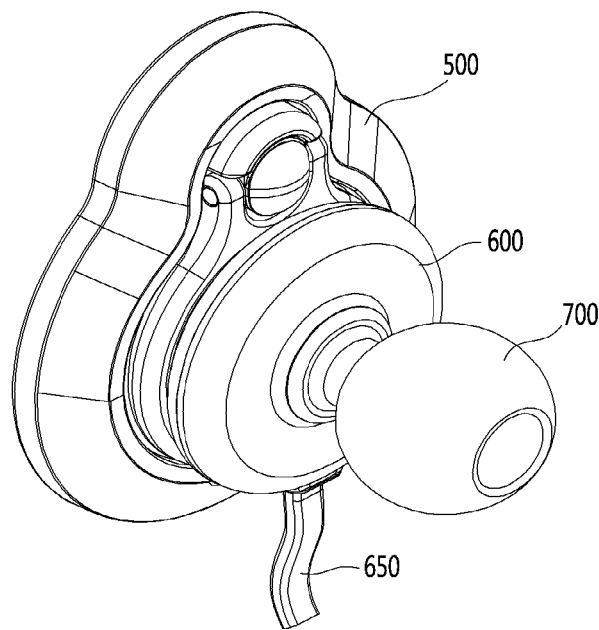
FIG. 16 is a perspective view showing the overall configuration of a wireless charging system according to another embodiment of the present invention.

FIG. 16 is a perspective view showing a general configuration of a wireless charging system according to another embodiment of the present invention, and the description of the same components as those described with reference to FIGS. 1 to 15 will be omitted below.

Referring to FIG. 16, the wireless charging device includes a terminal accessory 500 and a wireless charging module 600, the wireless charging module 600 may be combined with a ball 700 used in the ball joint structure for adjusting the angle of the portable terminal to which the terminal accessory 500 is attached.

The terminal accessory 500 has a structure in which the front housing is rotatable by the user while the rear housing is fixed to the back surface of the portable terminal, at least some of the circuitry (not shown) for supplying AC power to the transmitter coil of the terminal accessory 500 is provided outside the wireless charging module 600, and may be connected to the wireless charging module 600 through a cable 650.

Figure 17:
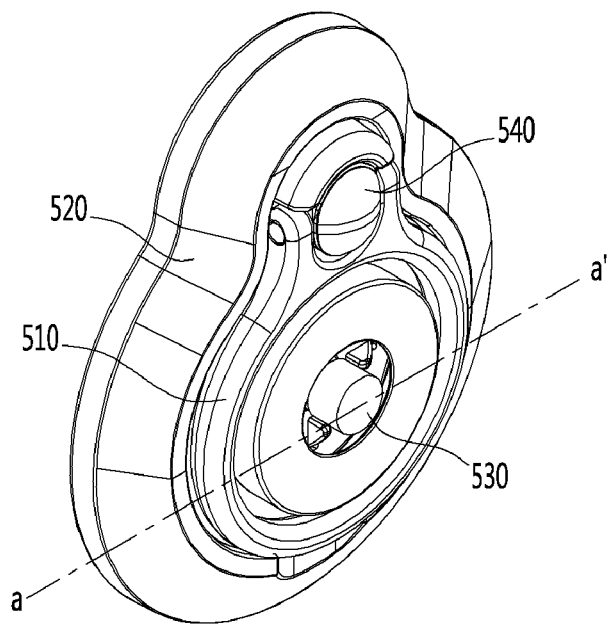
FIGS. 17 and 18 are views for explaining the detailed configuration of a terminal accessory shown in FIG. 16.
Figure 18:
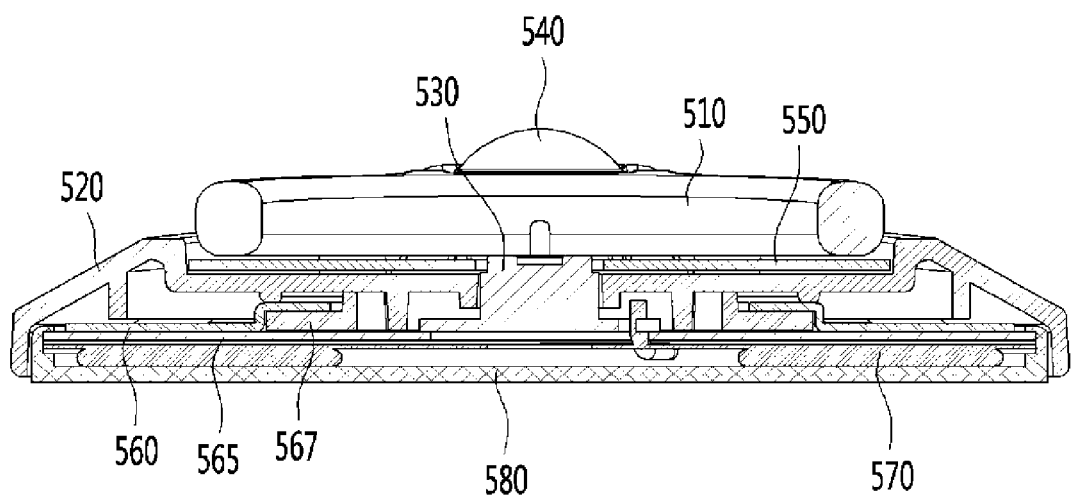

FIGS. 17 and 18 are diagrams for explaining the detailed configuration of the terminal accessory shown in FIG. 16, and FIG. 18 is a cross-sectional view showing a sectional configuration taken along the line a-a' of the terminal accessory 500 shown in FIGS. 17 and 18.

As shown in FIGS. 17 and 18, the terminal accessory 500 has a hook 510 that can be folded or unfolded in the back direction of the portable terminal by rotating the terminal accessory 500 by a predetermined angle using a hinge portion 540.

The terminal accessory 500 also includes a front housing 520 forming a frontal appearance, a first electric contact 530 for contacting the second electric contact of the wireless charging module 600 to supply AC power to the transmitting coil 570, and a metal plate 550 made of metal such as iron (Fe) or the like to be attached to the magnet of the wireless charging module 600.

On the other hand, in the terminal accessory 500, the rear housing 580 is fixed to the back surface of the portable terminal, and the front housing 520 may be coupled to the rear housing 580 to be rotatable.

Referring to FIG. 18, the rear housing 580 is made of a synthetic resin such as a plastic and is attached and fixed to the back surface of the portable terminal by using an adhesive member such as double-sided tape, and the front housing 520 rotatable by the user may be coupled to enclose a side portion of the rear housing 580.

Meanwhile, the terminal accessory 500 may include the rotating member 567 rotating together with the front housing 520 and at least one plate 560 or 567 for supporting the rotating member 567.

More specifically, the rotating member 567 made of a synthetic resin such as a plastic is fixedly coupled to the front housing 520 and rotates together, and the first plate 560 and the second plate 565 in the form of a disk made of a metal such as iron (Fe) may be configured so that at least a part of the rotating member 567 is flickered up and down.

As shown in FIG. 18, at least one of the first and second plates 560 and 565 may be fixed to the rear housing 580, and the second plate 565 is fixed to the rear housing 580 and the first plate 560 is engaged with the second plate 565 and does not rotate with respect to the rear housing 580, and to only support up and down.

The transmitting coil 570 may be positioned between the rear housing 580 and the plates 560 and 565 and more particularly between the second plate 565 and the bottom surface of the rear housing 580.

The transmitting coil 570 is electrically connected to the first electric contact 530 and is supplied with the AC power to generate a magnetic field for wireless charging.

Figure 19:
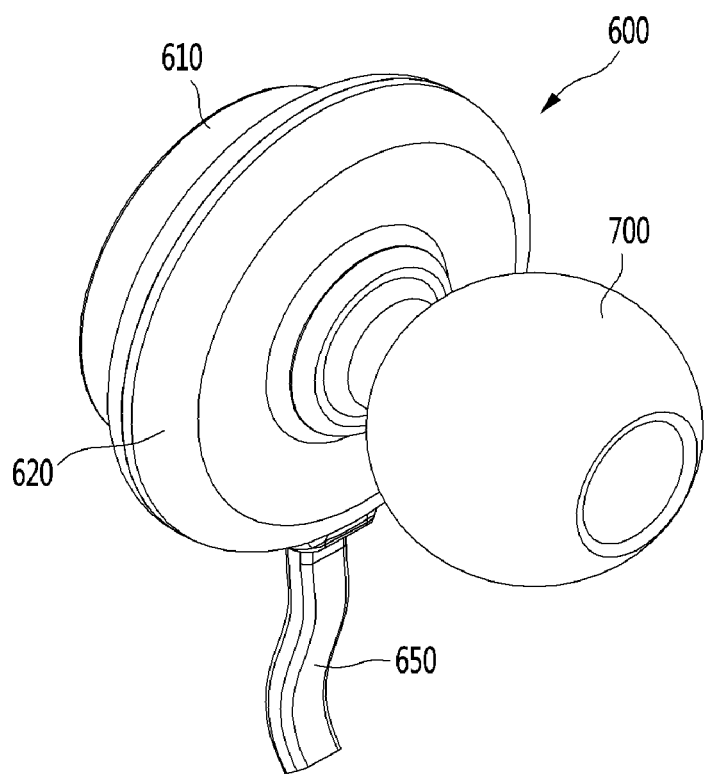
FIG. 19 is a perspective view for explaining a detailed configuration of the wireless charging module shown in FIG. 16.

FIG. 19 is a view for explaining the detailed configuration of the wireless charging module shown in FIG. 16.

Referring to FIG. 19, the wireless charging module 600 includes an attachment portion 610 that is magnetically attached to the first ground portion of the terminal accessory 500, and a body 620 coupled with the balls 700 of a ball joint structure, and the module cable 650 supplying the AC power.

The attachment portion 610 is provided with a magnet to which the metal plate 550 of the terminal accessory 500 is magnetically attached, and a second electric contact 530 having a second electric contact to which the first electric contact 530 of the terminal accessory 500 is contacted.

On the other hand, at least a part of the circuit portion for supplying the AC power to the transmitting coil 570 of the terminal accessory 500, and may be provided outside the wireless charging module 600 and connected to the wireless charging module 600 through the module cable 650.

For example, the circuit unit may include a first circuit unit connected to the wireless communication module 600 through a module cable 650, and a second circuit unit embedded in the wireless charging module 600.

Figure 20:
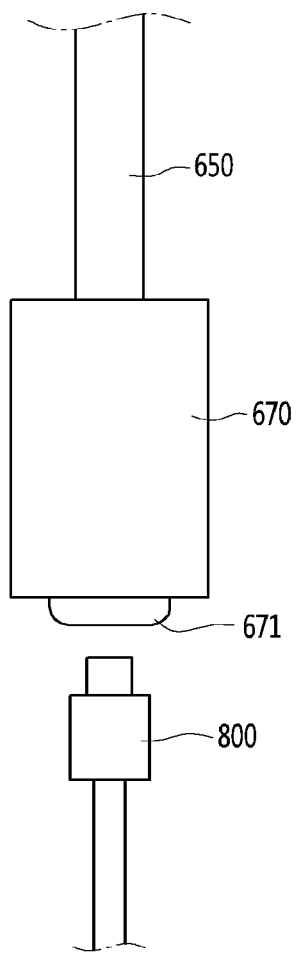
FIG. 20 is a view for explaining the detailed configuration of the cable shown in FIG. 16.

Referring to FIG. 20, a circuit module 670 composed of a first circuit unit, which is a part of the above-described circuit unit, may be connected to the end of the module cable 650.

Here, the first circuit unit constituting the circuit module 670 of the module cable 650 includes a power supply unit for receiving the DC power from the outside, and a conversion unit for converting the DC power supplied through the power supply unit into AC power.

Meanwhile, the second circuit unit included in the wireless charging module 600 of the circuit unit includes a power applying unit for applying an AC power, which is converted by the first circuit unit and input to the wireless charging module 600 through the module cable 650, to the second electric contact.

Here, the power applying unit may be embedded in the main body 620 of the wireless charging module 600.

Referring to FIG. 20, a circuit module 670 provided in the module cable 650 may be provided with a power terminal 671 for connecting the external power cable 800.

Although the embodiment of the present invention has been described with reference to FIG. 20 in which the circuit module 670 is provided at the end of the module cable 650, but the present invention is not limited thereto, the circuit module 670 may be coupled to the middle portion of module cable 650, and the power supply terminal 671 for connecting the power supply cable 800 may be included in a separate adapter provided at the end of the module cable 650.

The present invention has been described with reference to the drawings and the specification. Although specific terms are used herein, they are used for purposes of describing the present invention only and are not used to limit the scope of the present invention described in the claims or the claims.

Therefore, it is to be understood that the invention is capable of various modifications and equivalent arrangements, as would be apparent to those skilled in the art. Accordingly, the true scope of the present invention should be determined by the technical idea of the appended claims.

What is claimed is:

1. A portable terminal wireless charging device, comprising:
   a terminal accessory fixed to a back surface of a portable terminal and embedded with a transmitting coil for generating a magnetic field for wireless charging by magnetic induction; and
   a wireless charging module coupled to the terminal accessory and comprising a circuit unit for supplying an AC power to the transmitting coil,
   wherein the terminal accessory and the wireless charging module are each have a first electric contact and a second electric contact, and when the terminal accessory is coupled to the wireless charging module, the first and second electric contacts are respectively contacted with each other to supply the AC power from the circuit unit to the transmitting coil, and
   wherein one surface of the terminal accessory is adhered to the back surface of the portable terminal, and a rotatable hook and a first grounding portion having a first grounding terminal are disposed on another surface of the terminal accessory.

2. The portable terminal wireless charging device according to claim 1, wherein the first grounding portion is disposed inside a circular space formed by the rotatable hook in a state in which the rotatable hook is folded in a backward direction of the portable terminal.

3. The portable terminal wireless charging device according to claim 1, wherein the first ground portion has a circular shape, the first electric contact is located at a center of the first ground portion having the circular shape, and a first guide portion for facilitating engagement with the wireless charging module is disposed around the first electric contact.

4. The portable terminal wireless charging device according to claim 3, wherein the wireless charging module further comprises a second grounding portion including the second electric contact and configured to couple to the first grounding portion of the terminal accessory,
   wherein the second electric contact is located at a center of the second ground portion, a second guide portion corresponding to the first guide portion for facilitating engagement with the terminal accessory is disposed around the second electric contact.

5. The portable terminal wireless charging device according to claim 4, wherein one of the first and second guide portions comprises at least one fixing protrusion, and the other comprises at least one fixing grooves into which the at least one fixing protrusions is inserted.

6. The portable terminal wireless charging device according to claim 5, wherein when the at least one fixing protrusion is inserted into the at least one fixing groove, the first and second electric contacts are aligned and are in contact with each other.

7. The portable terminal wireless charging device according to claim 4, wherein at least one of the first and second grounding portions comprises a magnet, and the terminal accessory and the wireless charging module are attached by a magnetic force of the magnet.

8. The portable terminal wireless charging device according to claim 1, wherein the wireless charging module comprises a fixing portion configured to be fixed to a vehicle by fitting or attraction force.

9. The portable terminal wireless charging device according to claim 1, the circuit unit comprising:
   a power supply unit for receiving a DC power from an outside; and
   a conversion unit for converting the supplied DC power into the AC power;
   wherein the converted AC power is supplied to the transmitting coil of the terminal accessory through the second electric contact.

10. The portable terminal wireless charging device according to claim 1, wherein the circuit unit is embedded in the wireless charging module.

11. The portable terminal wireless charging device according to claim 1, wherein at least a part of the circuit unit is disposed outside of the wireless charging module to connect with the wireless charging module through a cable.

12. The portable terminal wireless charging device according to claim 9, wherein the circuit unit further comprises:
    an external first circuit unit connected to a wireless communication module through a cable; and
    a second circuit unit embedded in the wireless charging module,
    wherein the first circuit unit comprises the power supply unit for receiving the DC power from the outside and the conversion unit for converting the supplied power into the AC power, and
    wherein the second circuit unit comprises a power applying unit for applying the converted AC power to the second electric contact.

13. The portable terminal wireless charging device according to claim 1, wherein the terminal accessory further comprises:
    a rear housing fixed to the back surface of the portable terminal; and
    a front housing rotatably coupled to the rear housing.

14. The portable terminal wireless charging device according to claim 13, wherein the terminal accessory further comprises:
    a rotating member for rotating together with the front housing; and
    at least one plate for supporting the rotating member.

15. The portable terminal wireless charging device according to claim 14, wherein the at least one plate comprises:
    a first plate and a second plate for covering at least a portion of an upper portion and a lower portion of the rotating member,
    wherein at least one of the first and second plates is fixed to the rear housing.

16. The portable terminal wireless charging device according to claim 14, wherein the transmitting coil is located between the rear housing and the at least one plate.

17. A portable terminal wireless charging device, comprising:
    a terminal accessory fixed to a back surface of a portable terminal and embedded with a transmitting coil for generating a magnetic field for wireless charging by magnetic induction; and
    a wireless charging module coupled to the terminal accessory and comprising a circuit unit for supplying an AC power to the transmitting coil,
    wherein the terminal accessory and the wireless charging module are each have a first electric contact and a second electric contact, and when the terminal accessory is coupled to the wireless charging module, the first and second electric contacts are respectively contacted with each other to supply the AC power from the circuit unit to the transmitting coil, and wherein the terminal accessory further comprises:

a rear housing fixed to the back surface of the portable terminal; and a front housing rotatably coupled to the rear housing.

18. The portable terminal wireless charging device according to claim 17, wherein the terminal accessory further comprises:

a rotating member for rotating together with the front housing; and at least one plate for supporting the rotating member.

19. The portable terminal wireless charging device according to claim 18, wherein the at least one plate comprises:

a first plate and a second plate for covering at least a portion of an upper portion and a lower portion of the rotating member, wherein at least one of the first and second plates is fixed to the rear housing.

20. The portable terminal wireless charging device according to claim 18, wherein the transmitting coil is located between the rear housing and the at least one plate.

* * * * *